June 22, 1965 F. N. ROTHACKER 3,190,997
HEATING APPARATUS
Filed Feb. 16, 1961 2 Sheets-Sheet 1

INVENTOR
F. NEILL ROTHACKER
BY Stanley Wolder
Wolder & Gross
ATTORNEY

INVENTOR
F. NEILL ROTHACKER
BY Stanley Wolder
Wolder & Gross
ATTORNEY

United States Patent Office 3,190,997
Patented June 22, 1965

3,190,997
HEATING APPARATUS
Francis Neill Rothacker, Orange, N.J., assignor to Transcontinental Electronics Corporation, a corporation of New Jersey
Filed Feb. 16, 1961, Ser. No. 89,712
6 Claims. (Cl. 219—10.51)

The present invention relates generally to improvements in heating apparatus, and it relates particularly to an improved apparatus for the controlled electrical heating of extruder barrels, treating ovens, curing tunnels and the like.

Many types of equipment require the continuous heating to uniform, relatively high temperatures of the treated material often while the material is advanced along a predetermined path. Typical of such equipment are organic plastic extruders and injection molding machines, curing tunnels and the like. As exemplified by the plastic extruder, the material being handled must be heated a few hundred degrees Fahrenheit and the temperature of the material along the length of the extruder barrel must vary in a predetermined manner within very close limits. Electrical resistance heaters of various types and construction are generally employed in heating extruding barrels and these are wrapped around and encircle the barrel. This arrangement for heating extruder barrels possesses numerous drawbacks and disadvantages. To begin with, they are highly inefficient and are short lived and require frequent replacement. Furthermore, by reason of the heat being supplied to the outside surface of the barrel and having to travel to the barrel inner surface, the inertia for control purposes is high and results in temperature hunting over a wide range and forced cooling by means of oil, steam, water or the like. Moreover, by reason of the high currents required, the associated control and regulating equipment is correspondingly expensive. In addition, application and replacement of the resistance heaters are highly time consuming and require considerable care and skilled labor. Even with the use of great care, faulty applications frequently occur with the consequent occurrence of undesirable hot and cold spots. Another important drawback of the resistance heaters is the limitation of the maximum safe temperatures at which they may be employed. Induction and hysteresis type of heaters have been proposed and employed to a limited extent, but these still leave much to be desired and have not been widely accepted.

It is, therefore, a principal object of the present invention to provide improvements in heating systems.

Another object of the present invention is to provide an improved apparatus for the electrical heating of barrels, tunnels and the like.

Still another object of the present invention is to provide an improved apparatus for the hysteresis heating of extruder barrels, curing tunnels, heat treating ovens and the like.

A further object of the present invention is to provide an improved hysteresis heater for extruder barrels which is simple, easy to apply, highly versatile and flexible, highly efficient, rugged and durable.

Still a further object of the present invention is to provide an improved highly regulated adjustable hysteresis heating apparatus of the above nature wherein commercially available voltages and frequencies may be directly employed.

The above and other objects of the present invention will become apparent from a reading of the following description, taken in conjunction with the accompanying drawings, wherein FIGURE 1 is a longitudinal fragmentary sectional view of a plastic extruder employing a heating system in accordance with the present invention;

Figure 1:
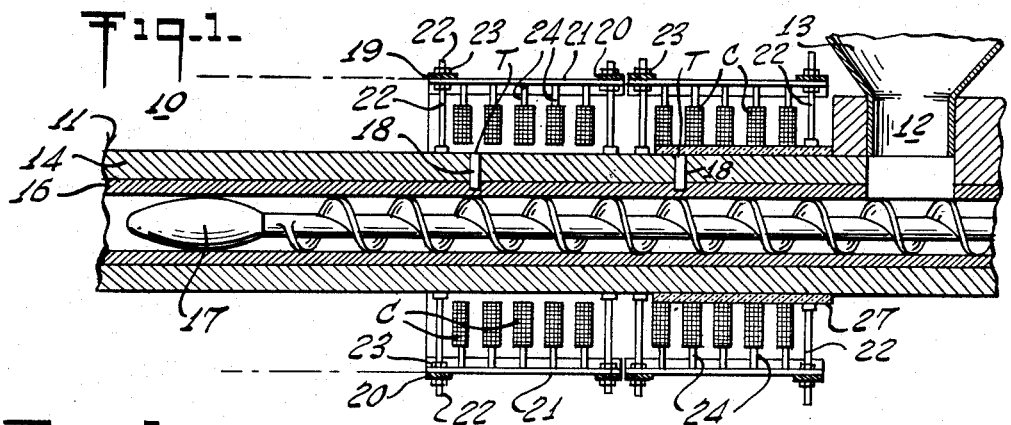
Figure 2:
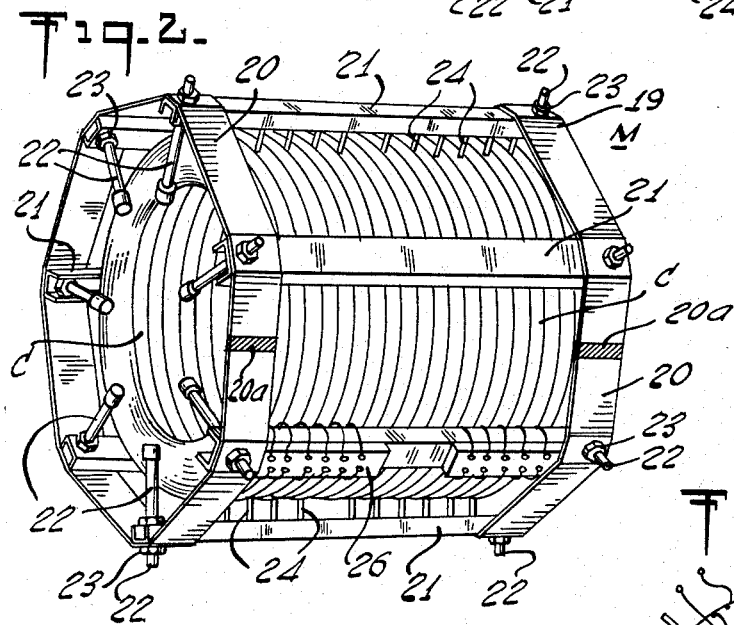
FIGURE 2 is a perspective view of one of the hysteresis heating units employed in the barrel heating system.
Figure 3:
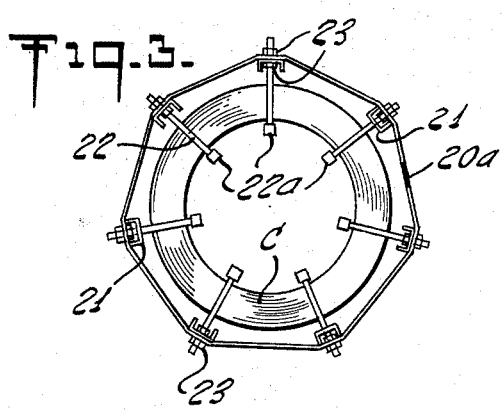
FIGURE 3 is an end elevational view thereof.

According to the present invention, the heating system comprises a magnetic transducing member including an inner portion having a relatively higher Steinmetz coefficient and an adjacent outer portion having a relatively low Steinmetz coefficient and a high magnetic permeability and means for inducing a magnetic field alternating at a low frequency in said transducer outer portion. The magnetic transducer is in the form of a longitudinally extending barrel having an inner tubular member with a high Steinmetz coefficient and an outer sleeve of low Steinmetz and high magnetic permeability. The magnetic inducing means includes a plurality of longitudinally spaced spider web coils registering with the barrel, the inner peripheries of the coils being closely spaced to the outer periphery of the barrel. The coils are connected to a source of low frequency alternating current to generate a corresponding varying magnetic field in the barrel sleeve which is transported with a minimum of losses to the inner tubular member which efficiently transduces the varying magnetic field into heat which is concentrated in the interior of the barrel where it may be employed as desired. Since the heat is generated at the interior of the barrel, the heat losses due to heat reaching the outer surface is greatly reduced. The use of the spider web coils is accompanied by great advantages. By reason of the air permeable nature of the spider web coil a high flow of cooling air through the coil is freely permitted obviating the need for any type of forced cooling either for temperature control of the barrel or safety cooling of the coils. Furthermore, by employing the spider web coils, high inductances and high hysteresis heat generating capacities are available with a minimum of resistance losses in the coils, the latter type of loss being highly undesirable since it represents inefficiency and reduces the coil capacity. Those portions of the barrel in which a high heat generating capacity is required are advantageously provided with a thin covering of a heat insulating material separating the barrel surface from the coils to thereby reduce heat losses from the covered barrel section as well as reducing the heating of the coils. At those sections of the barrel where the required heating capacity is low, that is where the material being handled requires little or no rise in temperature or a lowering of temperature, the insulating covering is advantageously omitted. The hysteresis heating along the length of the barrel may be varied by varying the distances between successive coils, the number of turns in the coils as well as the current through the coils and the relative phases thereof. The dimensions and magnetic properties of the barrel, the latter being heat sensitive, also control the heat generation.

The temperature regulating network includes a temperature sensitive element located in a well in the barrel and means responsive to the temperature sensitive element which varies the current through the coils, cuts off the current to one or more or all of the coils or reverses the phase of the current in one or more of the coils or a combination of any of the above. The reversal of phase in a coil relative to the current in the other coils results in increased hysteresis heating corresponding to the removal of three coils and the corresponding reduction in inductance and increase in ampere turns. Of course, simpler forms providing only a sleeve or the like may be employed should the system not require the efficiency of the tubular member and sleeve combination.

The frequency of the alternating or varying current energizing the coil should be at a low frequency, that is, as meant herein, between 25 and 50,000 cycles per second and the Steinmetz coefficient of the magnetic transducer inner member is preferably above .003 and that of the outer member below .003, and the ratio of the Steinmetz coefficients preferably exceeds 1.5:1. The magnetic permeability of the transducer outer member is preferably in excess of 100.

Referring now to the drawings and more particularly to FIGURES 1 to 4 thereof which illustrates a preferred embodiment of the present invention as applied to the heating of a plastic extruder barrel, the reference numeral 10 generally designates the extruder and heating assembly which includes an elongated extruder barrel 11 suitably supported and having at one end thereof a feed opening 12 communicating with a hopper 13 and provided at its opposite end with any desirable extrusion die (not shown) in any well-known manner. The barrel 11 includes an outer tubular shell 14 and an inner tightly nesting sleeve 16. The outer shell 14 is formed of a high magnetic permeability material having a relatively low Steinmetz coefficient, for example, the outer shell may be formed of annealed soft steel, having a Steinmetz coefficient of about .003 and a permeability of about 14,000 at room temperature, and having an inner diameter of 1.25 inches and an outer diameter of 3 inches. The inner sleeve 16 is force fit into shell 14, has an inner diameter of 1 inch and may be formed of steel alloy having a Steinmetz coefficient of about .04.

Extending along the length of the barrel 11 is a suitably driven coaxial screw 17 having a leading torpedo and being of any desired construction. The screw 17 may likewise be formed of a material having a high Steinmetz coefficient to increase the heating uniformity. A plurality of longitudinally spaced radial wells 18 are formed in the barrel 11 for the reception and housing of temperature sensitive members, for example, thermistors T for temperature control purposes.

One or more magnetic inductance units M are located along the length of and register with the barrel 11. Each of the induction units M includes a frame member 19 formed of a non-magnetic material and comprising a pair of longitudinally spaced polygonal end rings 20 the corresponding corners of which are connected by longitudinal channel members 21. Radially inwardly directed studs 22 are located adjacent the ends of the channels 21 and register with corresponding openings in the channel members 21 and are engaged by lock nuts 23 to permit the adjustment and locking thereof. The inner ends of the studs 22 are provided with insulator elements 22a which rest on the barrel 11 and the studs adjustably support the unit M on the barrel 11. Further, to minimize the heating of the frame, rings 20 are provided with insulator elements 20a so as to eliminate inductive heating of the rings.

Figure 4:
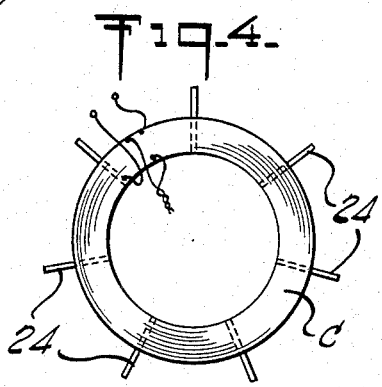
FIGURE 4 is a front elevational view of an improved type of hysteresis heating coil.

Coaxially supported by the frame member 19 are a plurality of longitudinally spaced spider web coils C. Each of the spider web coils C includes an odd number of insulating spokes 24, preferably between 5 and 9 in number, about which the wire forming the coil C is wound and interlaced in the known manner to produce a coil in which the wire is freely exposed along its length and hence readily dissipates heat. As seen in FIGURE 4 of the drawings, which illustrates a novel form of coil which may be employed to advantage, the coil is wound of a pair of corresponding wires the inner end of one of the coils being connected to the outer end of the other of said coils so that they are series connected in a common sense or phase. The consequence is an increase in the number of turns per given space with little interference in the cooling of the coil.

The coil spokes 24 terminate at about the inner peripheries of the coils C and extend beyond the outer edges thereof into engagement with the channels 21 which support the coils C thereby. A pair of terminal blocks 26 of conventional form are mounted on a channel member 21 and have terminals thereof connected to the respective ends of each of the coils C. Thus the coils C may be readily connected in series and in any desired phase relationships or in parallel or in various combinations in accordance with the heating and electrical properties desired.

When the units M are mounted on the barrel 11 the inner peripheries of the coils C are spaced from the outer surface of the barrel 71, preferably between ⅜″ and ½″, the smaller the barrel diameter the closer the aforesaid spacing. The spacing between successive coils C may be varied depending upon the desired heating and may be even in face to face abutment. Preferably, it should not exceed about 1 inch. The outer diameter of the coils should not exceed the barrel diameter by 5 inches and preferably not by 4 inches, and the thickness of the winding is preferably less than ¾″.

The coils C may be heat isolated from the barrel 11 by means of a layer 27 of suitable heat insulating material such as fiber glass, foamed glass, asbestos sheet, or the like superimposed on the barrel outer surface beneath the corresponding coils C. This is particularly advantageous where a large temperature increase is desirable. The inner peripheries of the coils may be spaced from the insulation outer surface.

Figure 5:
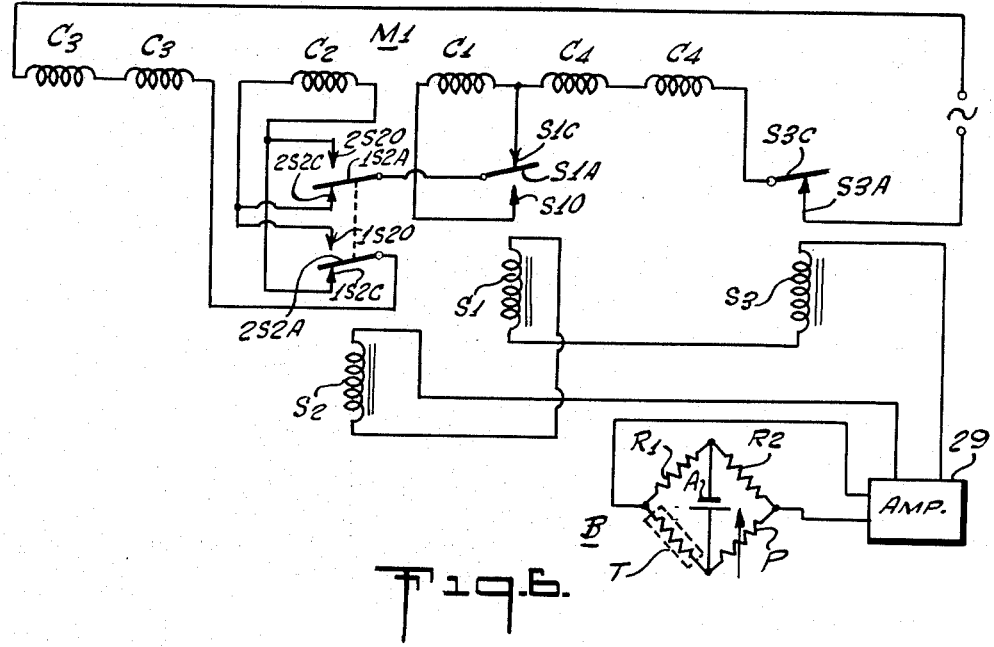
FIGURE 5 is a circuit diagram of an improved temperature control network employed with a heating unit.

In FIGURE 5 of the drawings there is illustrated a circuit network showing various forms of temperature control which may be advantageously employed with the subject coil. The network comprises a bridge B including a pair of adjacent upper resistor bridge arms R1 and R2 and lower bridge arms defined by the thermistor T and a rheostat P which permits adjustment of the regulated temperature. The upper and lower corners of the bridge B are connected to a suitable voltage standard A and the bridge side corners are connected to the input terminal to a D.C. amplifier 29. The output of the amplifier 29 is connected to relay solenoids S1, S2, and S3 which are connected in series. The control network is employed with the induction unit M1 which includes coils C1, C2 and series connected groups of coils C3 and C4.

Actuated by the solenoid S1 is an armature arm S1A having associated therewith normally closed and open contacts S1C and S1O respectively. Actuated by the solenoid S2 are a pair of ganged arms 1S2A and 2S2A having associated respectively therewith normally closed contacts 1S2C and 2S2C and normally open contacts 1S2O and 2S2O. Actuated by the solenoid S3 is an arm S3A having an associated normally closed contact S3C. The arms associated with the solenoids S1, S2 and S3 are so biased that the solenoid current required to actuate the corresponding arms are successively greater. One end of the coil group C3 is connected to one terminal of a suitable source of A.C. current, for example a 110- volt 60 cycle per second source, the other terminal of which is connected to relay arm S3A, and the other end of the coil group C3 is connected to relay arm 2S2A. The leading end of the coil C2 is connected to contacts 2S2O and 1S2C and the other end is connected to contacts 2S2C and 1S2O. The relay arm S1A is connected to relay arm 1S1A. One end of coil C1 is connected to contact S1O and the other end is connected to contact S1C and to an end of the coil group C4, the other end of the coil group C4 being connected to contact S3C. It should be noted that the coil C1 is by-passed and the coils C2 to C4 connected when the relay arms are deactuated as illustrated to effect a hysteresis heating of the barrel sleeve 16 with a relatively negligible electrical heating of the shell 14. Also hysteresis heating of the screw 17 is effected particularly where the latter has a high Steinmetz coefficient. Furthermore, the amplifier 29 is so phased that an increase in barrel temperature as sensed by the thermistor T results in an increase in the solenoid current.

In operation the coils C2, C3 and C4 are connected to the alternating current source to heat the barrel sleeve 16 due to hysteresis losses. The coils 3 and 4 are shown connected in phase and the coil 2 being shown oppositely phased to effect a lower impedance and greater hysteresis heating. As the barrel temperature increases the resistance of the thermistor T drops varying the signal to the amplifier 29 and accordingly the output thereof to the solenoids S1, S2 and S3. When the barrel temperature reaches a predetermined point the solenoid S1 is sufficiently energized to actuate arm S1A to close contact S1O and connect the coil to the circuit and hence reduce the hysteresis heating by reason of the overall impedance increasing to a much greater extent than the ampere turns. If the temperature rises further the solenoid S2 is energized sufficiently to actuate arms 1S2A and 2S2A opening contacts 1S2C and 2S2C and closing contacts 1S2O and 2S2O to reverse the phase of the magnetic induction of coil C2 to radically further reduce the hysteresis heating. In the event the temperature rises still further the solenoid S3 actuates arm S3A opening contact S3C and deenergizing the entire unit M1. As the barrel temperature drops the relay arms are deactuated in opposite sequence to above to correspondingly vary the degree of hysteresis heating and hence closely regulate the temperature. By reason of the various ranges of control by the different solenoids a close temperature regulation may be achieved.

Figure 6:
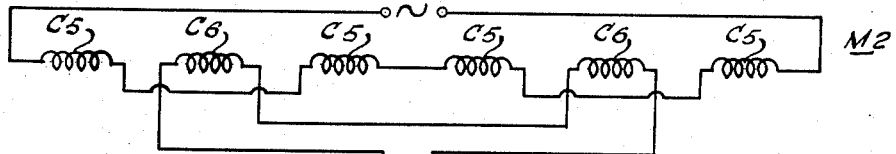
FIGURE 6 is a circuit diagram of a modified form of control network.

Another form of novel temperature control system which may be employed with the present hysteresis arrangement is illustrated in FIGURE 6 of the drawings. It includes the thermistor containing bridge B like that shown in FIGURE 5, the bridge being connected to the input of a D.C. amplifier 32. The induction unit M2 comprises a first group of series coupled coils C5 which are connected to a source of alternating current and a group of intervening series coupled second coils C6, which are connected to the output of the amplifier 32.

In operation the barrel is hysteresis heated by the unit M2 in the manner as above, the hysteresis losses in the sleeve 16 varying directly with the magnetic permeability of the shell 14. As the barrel temperature rises the current output of the amplifier 32 increases in response to the thermistor controlled bridge output to thereby increase the D.C. magnetization of the shell 16 and decrease the permeability thereof. As a consequence the hysteresis heating of the barrel 11 drops. Similarly, a drop in the barrel temperature is accompanied by an increase in the permeability of the shell 16 and an increase in the hysteresis heating. A close adjustable temperature regulation is thus realized.

Figure 7:
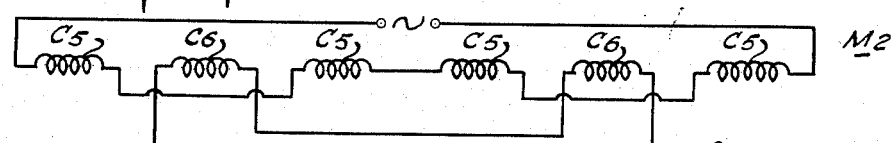
FIGURE 7 is a circuit diagram of a further modified form of control network.

In FIGURE 7 of the drawing there is illustrated still another unique form of temperature regulation device of great sensitivity. As in the previous embodiment the induction unit M2 includes the group of first coils C5 connected to a source of alternating current and a group of series connected second control coils C6. The coils C6 are connected through the controlled winding of a saturable core reactor 33 to a source of alternating current and are magnetically similarly phased relative to the coils C5. The control winding of the reactor 33 is connected to the output of the amplifier 32 which is controlled by the bridge network B as aforesaid.

In operation of the last described embodiment an increase in barrel temperature results in an increase in the current in the control winding of the reactor 33 and an increase in the impedance of the controlled winding thereof. As a result the alternating current through the coils C6 is decreased and hysteresis heating is reduced. In opposite manner an increase in the barrel temperature is followed by a decrease in the current in the coils C6 and an increase in the hysteresis heating to effect temperature regulation. As in the previous embodiments, the regulated temperature may be varied by adjusting the bridge rheostat P. Again, by reversing the phase of amplifier 32 and coils C6 good regulation may also be achieved.

Obviously, the heating elements and system described may be employed with a great variety of containers and conduits, including in addition to those mentioned above such various devices as piping for liquids and semi-liquids and pots for ink and other materials.

While there have been described and illustrated preferred embodiments of the present invention it is apparent that numerous alterations and omissions and additions may be made without departing from the spirit thereof.

What is claimed is:

1. A heating device comprising a tubular member of magnetic material having a relatively low Steinmetz coefficient and high magnetic permeability, and coil means surrounding said member for producing therein a low frequency alternating magnetic field, a second tubular member of magnetic material having a relatively high Steinmetz coefficient arranged within and tightly engaging the first named tubular member, and the Steinmetz coefficients for the inner and outer members being respectively above and below .003 and sufficiently different that the ratio of the coefficients for said inner and outer members exceeds a 1.5 to 1 ratio, thereby providing enhanced hysteresis heating of said inner tubular member.

2. A heating device according to claim 1, wherein the ratio of the Steinmetz coefficients of said inner to said outer tubular members is about 13 to 1.

3. A heating device according to claim 1, wherein said coil means comprises a plurality of induction coils extending along the length of said tubular members, and means connecting said coils in a predetermined phase relationship to a source of alternating current.

4. A heating device according to claim 3, wherein each coil is wound in spider web fashion by interlacing around and engaging alternate sides of an odd number, preferably 5 to 9, of radial insulating spokes.

5. A heating device according to claim 3, wherein each coil is wound in spider web fashion with a pair of parallel wires by collectively interlacing said pair of wires around and engaging alternate sides of an odd number, preferably 5 to 9, of radial insulating spokes, and the outer end of one wire being connected to the inner end of the other wire in said pair whereby the wires of said pair are series connected in a common phase.

6. A heat dissipating induction coil comprising a pair of parallel wires wound in spider web fashion by collectively interlacing said pair of wires around and engaging alternate sides of an odd number, preferably 5 to 9, of radial insulating spokes, and the outer end of one wire being connected to the inner end of the other wire in said pair whereby the wires of said pair are series connected in a common phase.

(References on following page)

References Cited by the Examiner

UNITED STATES PATENTS

| | | | |
|---|---|---|---|
| 1,568,871 | 1/26 | Brennan | 336—208 |
| 1,655,178 | 1/28 | Bruno | 336—208 |
| 2,180,513 | 11/39 | Fugill et al. | 219—10.77 X |
| 2,181,274 | 11/39 | Jackson et al. | 219—10.49 X |
| 2,226,446 | 12/40 | Smith et al. | 219—10.41 |
| 2,226,447 | 12/40 | Smith et al. | 219—10.51 |
| 2,226,448 | 12/40 | Smith | 219—10.51 |
| 2,441,564 | 5/48 | Combs | 336—208 |
| 2,759,087 | 8/56 | Lackner | 219—10.79 |
| 2,773,161 | 12/56 | Baker | 219—10.77 |
| 2,852,650 | 9/58 | De Coriolis et al. | 219—10.77 X |
| 2,893,055 | 7/59 | Wenzel | 219—10.49 |
| 2,904,664 | 9/59 | Rothacker | 219—10.49 |
| 2,933,584 | 4/60 | Thielsch | 219—10.49 X |

RICHARD M. WOOD, *Primary Examiner.*

MAX L. LEVY, *Examiner.*